United States Patent [19]

Vara et al.

[11] Patent Number: 5,015,365

[45] Date of Patent: May 14, 1991

[54] PROCESS FOR REMOVING HALOGENATED HYDROCARBONS AND OTHER SOLVENTS FROM A SOLVENT LADEN AIR (SLA) STREAM

[75] Inventors: Tomas E. Vara; Jerry L. Mestemaker; B. R. Thakker, all of Vero Beach, Fla.

[73] Assignee: Vara International Inc., Vero Beach, Fla.

[21] Appl. No.: 183,821

[22] Filed: Apr. 20, 1988

[51] Int. Cl.$^5$ .................. B01D 53/04; B01D 53/12
[52] U.S. Cl. ..................... 208/262.1; 208/262.5; 55/16; 55/46; 55/61
[58] Field of Search ............ 208/310 R, 262.1, 262.2; 585/819; 55/16, 18, 20, 25, 26, 28, 46, 51, 61

[56] References Cited

U.S. PATENT DOCUMENTS

| | | | |
|---|---|---|---|
| 2,760,594 | 8/1956 | Browning et al. | 55/198 |
| 3,883,325 | 5/1975 | Fuhring et al. | 55/20 |
| 3,963,461 | 6/1976 | Stockford et al. | 55/20 |
| 4,018,704 | 4/1977 | Kuragano | 502/35 |
| 4,056,369 | 11/1977 | Quackenbush | 208/262.1 |
| 4,219,537 | 8/1980 | Steiner | 423/569 |
| 4,261,716 | 4/1981 | Schwartz et al. | 55/387 |
| 4,276,058 | 6/1981 | Dinsmore | 55/48 |
| 4,286,972 | 9/1981 | Savage et al. | 55/58 |
| 4,331,456 | 5/1982 | Schwartz et al. | 55/58 |
| 4,343,629 | 8/1982 | Dinsmore et al. | 55/48 |
| 4,414,003 | 11/1983 | Blaudszun | 55/18 |
| 4,553,983 | 11/1985 | Baker | 55/16 |
| 4,661,256 | 4/1987 | Johnson | 208/262.1 X |
| 4,689,054 | 8/1987 | Vara et al. | 55/61 |

OTHER PUBLICATIONS

"Vapor-phase Adsorption Cuts Pollution, Recovers Solvents", Parmele, O'Connell, Basdekis, Chem. Eng., Dec. 1979, pp. 68-69.
"Spontaneous Combustion of Carbon Beds" by A. A. Navjokas Plant/Operations Process, 4/85.
"Special Report-Volatile Organic Compounds" by Paul N. Cheresminoff, Pollution Engineering, 3/85.
"Solvent Recoverysystem Controls Pollution While Saving Money", Spring '85.
"Solvent Recovery-Answer to Efficient Pollution Control in Production of Pressure-Sensitive Materials", Spring 1985.
"Focus on Solvent Recovery" by Michael Thomas, Operations Improvements, Oct. 1985.

Primary Examiner—Glenn Caldarola
Attorney, Agent, or Firm—Eckert, Seamans, Cherin & Mellott

[57] ABSTRACT

A process for removing halogenated hydrocarbons and other solvents from a solvent laden air (SLA) stream, includes the step of passing the SLA from an SLA intake through at least three adsorbers each containing an activated carbon bed. At least one adsorber undergoes regeneration while at least two other adsorbers operate in series in the adsorption mode. Regeneration is accomplished by passing a regenerating fluid such as steam through the bed. The steam and solvent vapor is condensed to form a liquid having at least one solvent rich fraction and at least one solvent poor fraction. This condensation product undergoes one or more separation steps to remove the solvent rich fractions from the solvent poor fractions. Non-condensibles are returned to the SLA intake. The SLA is pre-conditioned prior to the SLA inlet to remove extraneous contaminants and to control inlet conditions of temperature, relative humidity and flow rate. Removal efficiencies of 99 percent and above are attainable by the process.

11 Claims, 3 Drawing Sheets

PROCESS FOR REMOVING HALOGENATED HYDROCARBONS AND OTHER SOLVENTS FROM A SOLVENT LADEN AIR (SLA) STREAM

BACKGROUND OF THE INVENTION

1. Field of the Invention

This invention relates generally to processes for removing solvents from solvent laden air streams, and more particularly to processes for removing halogenated hydrocarbons and other solvents from solvent laden air streams.

2. Description of the Prior Art

The release of halogenated hydrocarbons into the atmosphere has drawn increasing attention from the scientific community as evidence gathers that the accumulation of these compounds in the atmosphere can adversely affect the earth's ozone layer. Governments have been increasingly conscious of controlling the emission of these compounds, particularly fluorocarbons, from industrial plants. Processes have been developed in the past to remove halogenated hydrocarbons and other solvents from process emissions. These processes improve the purity of the emitted stream, but do not reach the level of purity necessary to satisfy current environmental control demands.

SUMMARY OF THE INVENTION

It is an object of the invention to provide a process for removing halogenated hydrocarbons and other solvents from a solvent laden air stream.

It is another object of the invention to provide a process which will provide an effluent stream of sufficient purity to satisfy environmental control demands.

It is still another object of the invention to provide a process for removing halogenated hydrocarbons and other solvents from a solvent laden air stream in which process components can be regenerated without significant emissions of contaminants.

These and other objects are accomplished by a cyclic process for removing solvents including halogenated hydrocarbons from a solvent laden air (SLA) stream, including the steps of:

(a) pre-conditioning the SLA to remove particulates and to adjust conditions of temperature and relative humidity;

(b) passing the SLA through at least two activated carbon adsorption beds connected in series;

(c) regenerating at least one additional activated carbon adsorption bed, the regeneration comprising the steps of:

(i) passing a regenerating gas through the adsorption bed, the regenerating gas removing halogenated hydrocarbons and other solvents from the bed;

(ii) condensing the regenerating gas to form a liquid fraction having at least one solvent rich fraction and at least one solvent poor fraction;

(iii) returning non-condensibles to the SLA inlet stream of step (b);

(iv) passing the liquid fractions to process battery limits; and, (d) returning the regenerated bed of step (c) to the series of adsorption beds of step (b), and removing at least one of the adsorption beds from the series of step (b) and regenerating this bed by the process of step (c).

Operation of the adsorption beds is preferably counter-current such that a bed regenerated in step (c) is returned to the adsorption series of step (b) as the last bed in the series of adsorption beds. The SLA flow is rerouted through the series such that the numerical position of the beds in the series is incremented upstream. Other beds in the series are moved sequentially one step further from the SLA inlet. The bed that occupied the first position of the beds in the series is removed for regeneration, after which it is returned to the series rotation as the last bed in the series.

The regeneration gas is preferably steam. The liquid fraction resulting from the condensation of step (c) (ii) is preferably processed to separate the solvent rich fraction from the solvent poor fraction. The solvent rich fraction is passed to process battery limits, and preferably to collection means. The solvent poor fraction is preferably processed further to remove solvents from this fraction. Non-condensibles from the processing step of the solvent poor fraction are passed to the SLA inlet stream of step (b) for re-contact with the carbon adsorption beds. The recovered solvents are passed to collection means.

Processing of the solvent poor fraction preferably comprises contacting the solvent poor fraction with air in an air contactor. Air leaving the contactor is passed to the SLA inlet stream of step (b) such that solvents removed by the air are re-contacted with the carbon adsorption bed.

The condensation of regeneration steam preferably includes a bulk vapor condensation step and a vent condensation step. The vent condensation step is adapted to condense non-condensibles leaving the bulk vapor condensation step. Non-condensibles from the vent condensation step are returned to the SLA inlet stream. Condensed liquid from the vent condensation step is passed to the separation step where the solvent rich liquid fraction is separated from the solvent poor liquid fraction.

The liquid fraction from the vapor condensation step will normally be at a higher temperature than the liquid fraction from the vent condensation step. It is preferable to equalize these temperatures prior to mixing with the liquid fraction from the vent condensation step for separation. This can be accomplished by lowering the temperature of the liquid fraction from the vapor condensation step by means of a heat exchange step.

The separation of the condensation products into a solvent rich fraction and a solvent poor fraction is preferably decantation. Vapor product from the decantation will normally contain some solvent and preferably is returned to the SLA inlet stream entering the adsorbers.

The adsorption step (b) preferably comprises passing the SLA through at least two adsorbers connected in series. A third adsorber is regenerated simultaneously while the other two are performing the adsorption step (b). The respective adsorbers can be alternated such that each adsorber is periodically regenerated while at least two other adsorbers are performing the adsorption step. More adsorbers in series are also possible, which would reduce the frequency of regeneration that is necessary. It is also possible to provide a battery consisting of sets of series adsorbers connected in parallel.

The SLA is preferably preconditioned before entering the adsorbers. The SLA is preferably passed through a guard filter means that is adapted to remove contaminants that otherwise might plug the activated carbon bed in the adsorbers. The guard filter means preferably comprises an activated carbon bed that is of a smaller volume than the beds in the adsorbers. This bed is periodically discarded when it has been substantially deactivated with contaminants. Filter means for particulates can also be provided. The temperature of the SLA inlet stream is preferably adjusted in a heat exchange step. The pressure of the SLA stream can also be adjusted in a SLA blower step.

Cooling the bed after regeneration with hot gas has been found to promote efficient adsorption of the solvents, and particularly the halogenated hydrocarbons, on the activated carbon. The gas stream can be selected from several suitable gases. Air is a preferable cooling gas because of its availability and attendant reduced operating costs. The cooling air stream leaving the adsorber can be passed to the SLA inlet stream such that residual solvents removed by the cooling air stream are recirculated to the carbon adsorption beds. The cooling gas is preferably subjected to a heat exchange step prior to passage through the adsorbers in the cooling step.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Figure 1:
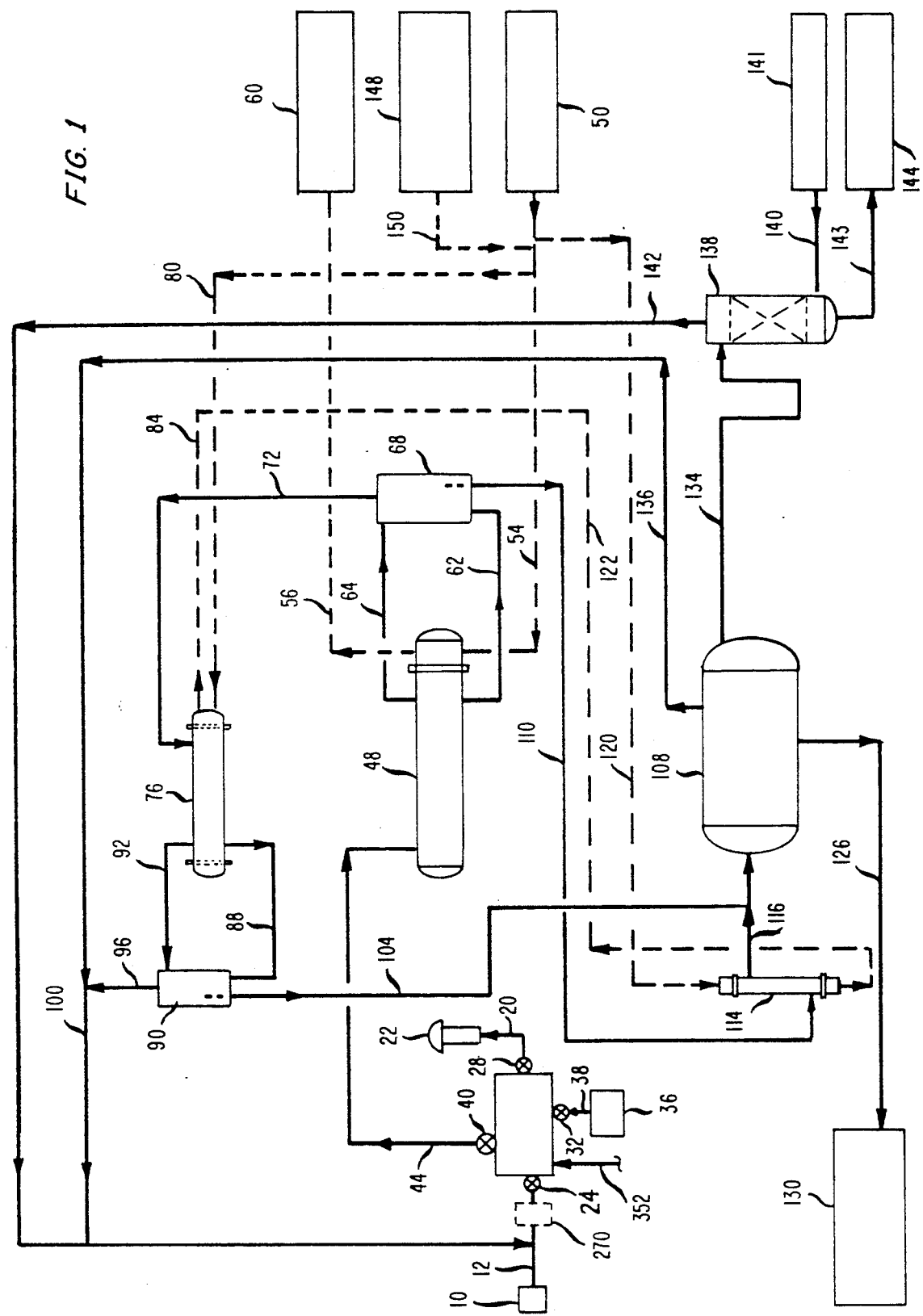
FIG. 1 is a schematic diagram of a process according to the invention.

There is shown schematically in FIGS. 1-4 a preferred process according to the invention. The solvent laden air (SLA) enters through an SLA inlet 10. The SLA is conveyed by a path 12 to an adsorption step 16. Purified air leaves the adsorbers through a path 20 and can, in the usual case, be vented through vent means 22.

The adsorption step 16 is accomplished by the utilization of adsorbers in series having activated carbon beds. The beds gradually accumulate adsorbed halogenated hydrocarbons and other solvents and must be regenerated. The bed of activated carbon is preferably regenerated when desorption equilibrium is attained or nearly, that is, when the rate of contaminant particles that are adsorbed by the bed is matched or nearly matched by the rate of particles that leaves or passes the bed. Regeneration begins with closure of the paths 12 and 20 such by valve means 24 and 28, respectively. Valve means 32 are opened to permit steam from a steam supply 36 to traverse path 38 into the adsorber 16. The steam temperature is preferably between about 215 degrees Fahrenheit and about 275 degrees Fahrenheit. Valve means 40 are opened to permit the escape of steam/solvent vapors from the adsorbers through an adsorber battery outlet path 44.

The steam/solvent vapors are conducted by the path 44 to a vapor condensor means 48. The temperature of this mixture is preferably between about 200 degrees Fahrenheit and about 230 degrees Fahrenheit. The vapor condensor means 48 can be supplied with cooling means such as chilled water through the chilled water supply 50. The chilled water preferably has a temperature between about 35 degrees Fahrenheit and about 55 degrees Fahrenheit. Chilled water enters the vapor condensor means 48 through a chilled water supply path 54. The chilled water leaves the vapor condensor means 48 through a chilled water return path 56 which conducts the chilled water to a chilled water return 60. The steam consumption typically ranges from about 0.05 and about 0.50 lb. steam per pound of regenerated carbon.

Condensed water and solvents form the bottoms of the vapor condensor means 48 and are routed through a vapor condensor liquid exit path 62. Non-condensibles leave the vapor condensor means 48 through a vapor condensor vapor exit path 64. The temperature of the non-condensibles and liquids leaving the vapor condensor 48 preferably ranges between about 110 degrees Fahrenheit and about 130 degrees Fahrenheit. Seal bottle means 68 can be provided and connected to the vapor condensor liquid exit path 62 and the vapor condensor vapor exit path 64 to monitor the liquid level in the vapor condensor means 48.

Non-condensibles leaving the seal bottle means 68 are passed through a seal bottle vapor exit path 72 and can be returned to the SLA intake path 12 but preferably are directed to a vent condensor means 76. The vent condensor means 76 receives cooling means such as chilled water from the chilled water supply 50 through a vent condensor chilled water supply path 80. Chilled water leaves the vent condensor means 76 through a vent condensor chilled water return path 84. Condensibles leave the vent condensor means 76 through a vent condensor liquid exit path 88 which can lead to vent condensor seal bottle means 90. Vapors leave the vent condensor means 76 through a vent condensor vapor exit path 92, which also can be connected to the vent condensor seal bottle means 90. Vapors and condensibles leaving the vent condensor means 76 will preferably have a temperature between about 60 degrees Fahrenheit and about 80 degrees Fahrenheit. Vapors leave the vent condensor seal bottle means 90 through a vent condensor seal bottle vapor exit path 96 which connects to a SLA return path 100. The SLA return path 100 returns the vapors to the SLA inlet path 12 so that these vapors can be passed again through the adsorption/regeneration system.

Condensibles leaving the vent condensor seal bottle means are conducted by a vent condensor seal bottle liquid exit path 104 to liquid separation means such as the decanter means 108. Liquids leaving the vapor condensor seal bottle means 68 are conducted by a vapor condensor seal bottle liquid exit path 110 to heat exchanger mean 114. The heat exchanger means 114 is adapted to cool the liquids received from the vapor condensor 48 to a temperature substantially equal to the temperature of the liquids received from the vent condensor 76, as the latter will generally be significantly cooler than the former. The heat exchanger means receives chilled water or the like from the chilled water supply 50 through a heat exchanger chilled water supply path 120. Chilled water is returned through a heat exchanger chilled water return path 122. Liquids leave the heat exchanger means 114 through a heat exchanger exit path 116 which joins the vent condensor seal bottle liquid exit path 104, and both streams of liquids are passed to the decanter means 108.

The decanter means 108 separates the liquid into a heavy solvent layer and a water layer. In the case of chlorofluorocarbons and other halogenated hydrocarbons, the heavy solvent layer will form the bottom of the decanter means 108 and can exit through a solvent exit path 126 to a product quality control tank 130. The water layer will thus form at the top of the decanter means 108 and leaves the top of the decanter means 108 through a decanter water exit path 134. Non-condensibles leave the decanter means 108 through a decanter vapor exit path 136 which joins the SLA return path 100 to return these vapors to the SLA inlet path 12.

The concentrations in the different vapor and liquid phases will be determined, at the limit, by equilibrium conditions for the compounds that are present and operating parameters such as temperature and inlet concentrations. The equilibrium condition will be disrupted by the constant withdrawal of compounds from the process. A dynamic equilibrium may be attained, but must be calculated or determined empirically on a case by case basis.

The water layer leaving the decanter means 108 preferably is carried by the decanter water exit path 134 to scrubbing means such as the air stripper means 138. Air is supplied to the air stripper means 138 from an ambient air supply path 140 which receives the air from a source 141. The air stream preferably has a temperature between about 70 degrees Fahrenheit and about 150 degrees Fahrenheit. Air leaves the air stripper means 138 through an air exhaust path 142 which preferably joins the SLA intake path 12 for adsorption/regeneration. The treated water leaving the air stripper means 138 is conducted by an air stripper water outlet path 143 to a condensate storage tank 144. Water used in the process can be made up from a chilled water make up supply 148 which is supplied to the system through a chilled water make-up inlet path 150 connecting to the chilled water system preferably at or near the chilled water supply 50.

The adsorbers 16 can be selected from several suitable designs. The flow of SLA through the adsorbers is preferably directed downward through the adsorption beds. The charge of carbon in each adsorber can vary for the particular process parameters and equipment sizing. The working capacity of the carbon, defined as the unit weight of solvent adsorbed per one hundred unit weight of carbon is between about 1% and about 15%.

The inlet of the SLA to adsorbers connected in a series is generally to the adsorber in the series that has been in the adsorption cycle for the longest period of time. This adsorber receiving the inlet SLA will generally be the next adsorber in the series to undergo regeneration. Adsorbers returning to the series from the regeneration cycle will generally be last in the series from the SLA inlet. This principle can be practiced with any number of adsorbers in series, and variations are possible. The flow connections can be adapted to fit the purposes and equipment at hand. It is also possible to provide electronic control of the valves to automatically switch the position of the adsorbers in the adsorption cycle and the regeneration cycle when pre-determined conditions are met.

Figures 2A, 2B, 2C:
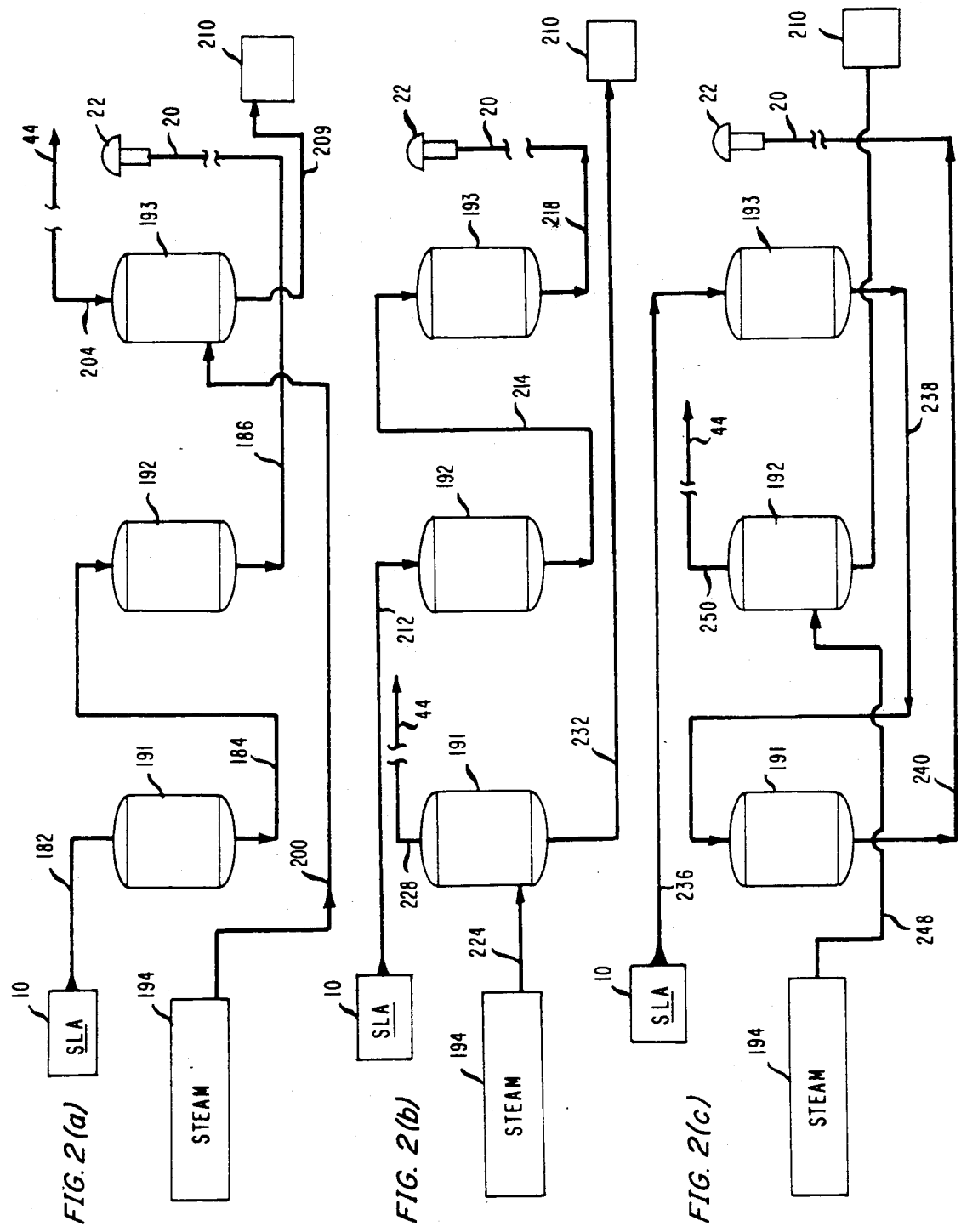
FIG. 2a is a schematic diagram of an adsorber series in a first flow configuration.
FIG. 2b is a schematic diagram of an adsorber series in a second flow configuration.
FIG. 2c is a schematic diagram of an adsorber series in a third flow configuration.

The use of series adsorbers is depicted schematically in FIGS. 2(a)-(c), wherein two adsorbers are shown connected in series in any point in the adsorption process. The series of adsorbers 191-193 receives SLA from the inlet source 10. In the first mode of operation shown in FIG. 2(a), the adsorber 191 receives the SLA through a branch SLA path 182. The SLA travels from the outlet of adsorber 191 through a path 184 to the inlet of adsorber 192. Treated air leaves adsorber 192 through an outlet path 186 which connects to the path 20 such that the treated air is released through the vent 22 (FIGS. 1-2).

Adsorber 193 undergoes regeneration and is shown removed from the adsorption series, which removal can be accomplished through the appropriate switching of valve means. Steam supplied from a source 194 is passed by a steam line 200 to the adsorber 193 The steam line 200 preferably opens into the adsorber 193 beneath the adsorption bed so that the flow of steam through the bed is upward. The steam and solvent vapors leave the adsorber 193 through an adsorber exit path 204. The adsorber exit path 204 connects to the adsorber battery outlet path 44 (FIG. 1), where the steam/solvent mixture is processed as described above to separate solvents. Condensibles leave the adsorber 193 through an adsorber condensate outlet path 209 which opens into a battery condensate collection tank 210.

In a second mode of operation (FIG. 2(b)), flow through the adsorbers has been rerouted through alternate flow paths by the appropriate switching of valves. Adsorber 192 receives SLA from the SLA source 10 through a second branch SLA path 212, and is now the first adsorber in the adsorption series. SLA travels out of adsorber 192 through a path 214 to the third adsorber 193, after which it is exhausted through a path 218, which connects to the path 20 and the vent 22.

Adsorber 191 undergoes regeneration in the second mode of operation. Steam is supplied from the source 194 to adsorber 191 through a branch steam path 224. Steam and solvent vapors exit through an adsorber outlet path 228 to the adsorber battery outlet path 44. Condensibles leave the adsorber 191 through a second adsorber condensate outlet path 232 which opens into the battery condensate collection tank 210.

In the third mode of operation adsorber 193 receives SL from the SLA source 10 through a third branch SLA path 236. The SLA leaves the adsorber 193 through an outlet path 238 which connects to the inlet of adsorber 191. Treated air leaves adsorber 191 through an outlet path 240 which connects to the path 20 and the vent 22 Adsorber 192 undergoes regeneration and receives steam from the steam source 194 through a branch path 248. Steam leaves the adsorber 192 through an adsorber outlet path 250 and is passed to the adsorber battery outlet 44. Condensibles leave the adsorber 192 through an adsorber condensate exit path 254 which joins the battery condensate collection tank 210.

Figure 3:
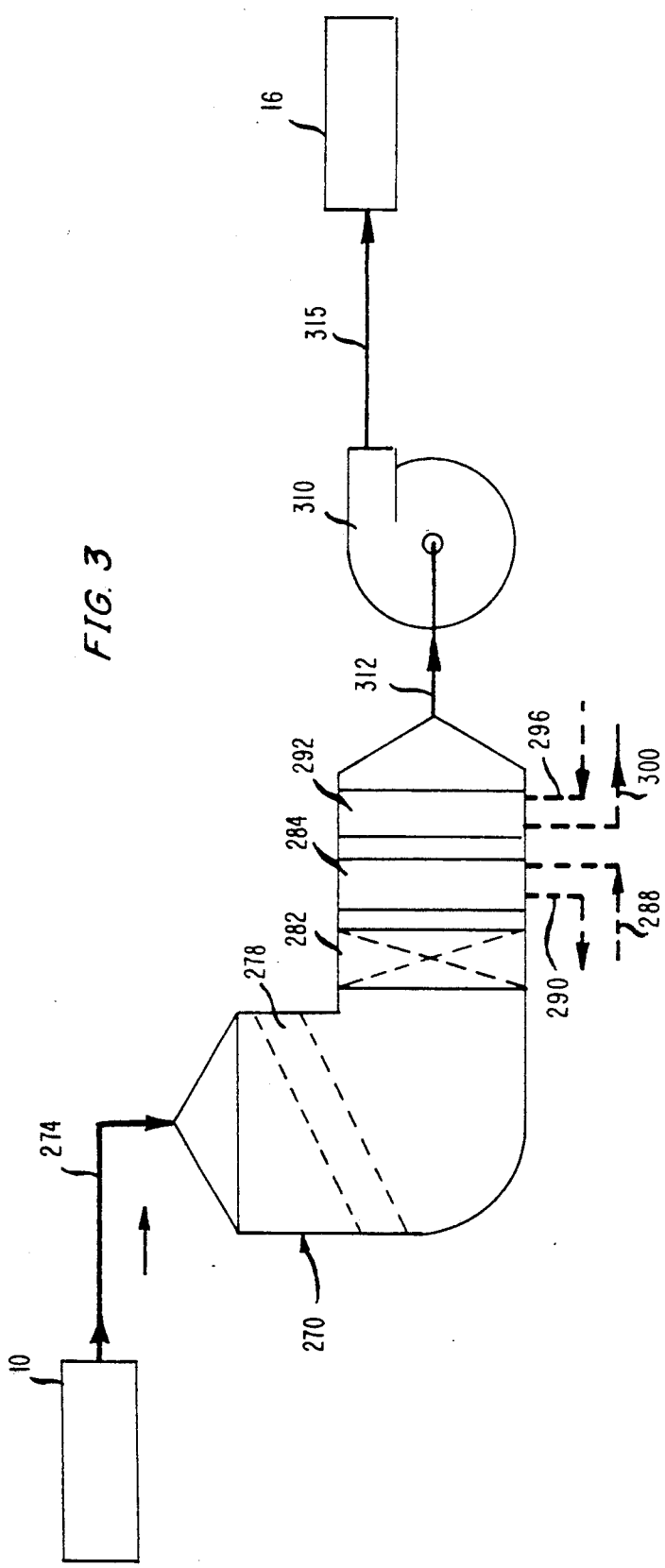
FIG. 3 is a schematic diagram of a solvent laden air pre-conditioning unit according to the invention.
Figure 4:
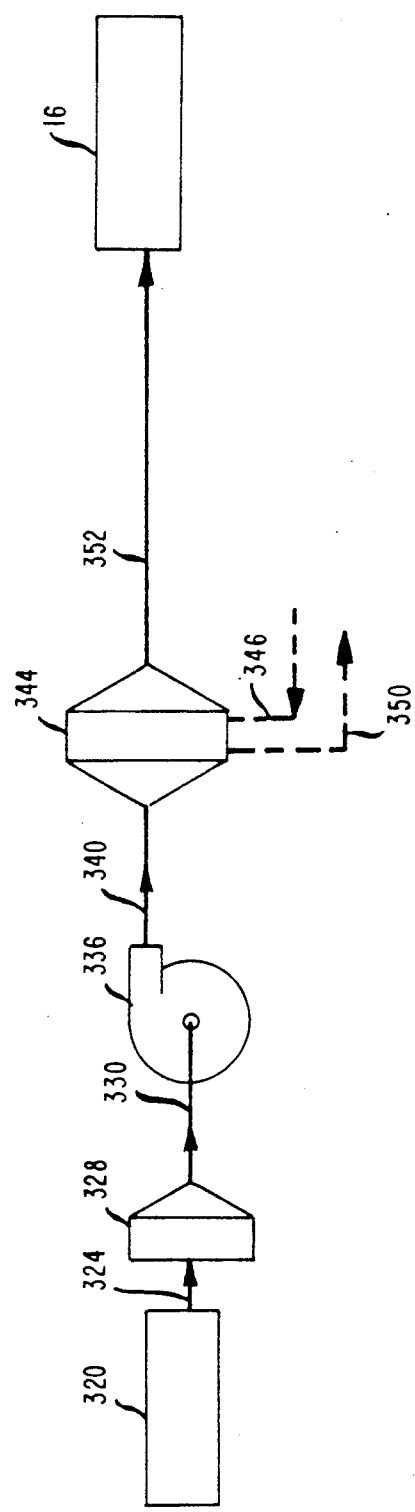
FIG. 4 is a schematic diagram of a cooling air pre-conditioning unit.

It is preferable to pre-condition the SLA prior to adsorption. A suitable pre-conditioning unit is shown in FIG. 3. The pre-conditioning components can be assembled in a single housing 270 which can receive the SLA from the SLA source 10 through an input path 274. A guard bed 278 is positioned in the flow path to remove extraneous contaminants such as oils, particulates, and the like that might prematurely plug the main beds in the adsorbers. The guard bed thereby prolongs the life of the adsorber beds. The guard bed preferably consists of a small charge of carbon, which can range from 5% to 15% of the weight of carbon in the adsorption beds of the adsorbers 191-193. The small size of the guard bed provides easy and inexpensive removal and replacement of the carbon when it becomes contaminated. The adsorption beds, which contain much larger charges of carbon, are expensive to replace and usually bed lives of several months to a few years are desired. The guard bed helps to insure that such a life for the adsorption beds will be attained.

A particulate filter 282 can be provided downstream from the guard bed. The particulate filter 282 removes minute solids from the air stream which have passed the guard bed 278. The particulate filter 282 can be selected from a number of filter means suitable for this purpose.

It is also preferable to adjust the temperature and relative humidity of the incoming SLA for maximum process efficiency. The temperature of the SLA entering the adsorber battery is preferably between 60 degrees Fahrenheit and about 80 degrees Fahrenheit. The relative humidity is preferably between about 15% and about 60%. Cooling of the SLA stream can be accomplished in heat exchanger means. The cooling heat exchanger means 284 can be selected from a number of heat exchange devices suitable for this purpose. The cooling heat exchanger 284 can be a coil exchanger supplied with a cooling fluid such as chilled water. The chilled water is received through a chilled water inlet path 288 and exits through a chilled water exit path 290. The SLA can be warmed through a heating heat exchanger 292 which can be selected from a number of suitable designs. The heating heat exchanger 292 can be a coil exchanger which receives steam through a steam inlet path 296. Steam exits the exchanger through a steam exit path 300.

Conventional blower means 310 can be provided to raise the pressure of the SLA inlet stream to a desired level for maximum adsorption efficiency. The blower means 310 can be selected from a number of blower means suitable for this purpose. The blower means 310 receives the SLA from a blower inlet path 312 and exits the blower means 310 through a blower exit path 315. The SLA can be passed from the blower exit path 315 directly to the adsorption stage 16 of the process.

Cooling means such as a stream of cooling air is preferably applied to the adsorption beds immediately after regeneration to cool the beds prior to returning them to the adsorption cycle. Cooler beds have been found to result in more efficient adsorption. Air is a preferable cooling fluid because of its ready availability. Ambient air can be drawn from an inlet 320 into an air inlet path 324 which directs the air to a filter means 328 adapted to filter particulates from the air. The filter 328 can be selected from a number of filters suitable for this purpose. Cooling air leaves the filter 328 and is directed by a cooling blower inlet path 330 to a cooling blower means 336. The cooling blower means 336 ensures a proper flow through the adsorption bed during the cooling cycle. The cooling blower means 336 can be selected from a number of blower devices suitable for this purpose. Air leaves the cooling blower means 336 through a cooling blower exit path 340.

The temperature of the cooling air is preferably between about 32 degrees Fahrenheit and about 150 degrees Fahrenheit. Heat exchange means such as the steam coil heat exchanger 344 can be provided to adjust the temperature of the cooling air as desired. The steam coil heat exchanger 344 receives steam through a steam inlet path 346 and exhausts the steam through a steam exit path 350. Air leaves the heat exchange means cooling air to the adsorption beds for the cooling cycle.

EXAMPLE

The following example is intended to demonstrate the operation of the process. Actual process variables including temperature, flow rates, and equipment design and sizing may vary widely depending on the type and loading of the solvents, the inlet conditions including temperature, relative humidity and flow rate, as well as the removal efficiency that is desired.

A solvent laden airstream flowing at a rate of 3,000 SCFM has a temperature of 70 degrees Fahrenheit and a relative humidity of 25%. The solvent to be removed is chlorofluorocarbon 113 at a concentration of 5,000 ppm, by volume, or a mass flow rate of 450 pounds per hour. The targeted emission level in the treated air is 50 ppm, by volume, or a removal efficiency of approximately 99%.

Three adsorbers are incorporated in the example design. Two adsorbers are adsorbing in series at any time, while a third undergoes regeneration and standby. The adsorption temperature is 70 degrees Fahrenheit, the carbon load per adsorber is 4,500 pounds, and the design working capacity of the carbon is 10%. Steam consumption for regeneration is approximately 0.25 pounds steam per pound of carbon. A guard bed is provided and comprises 5% of the carbon loading in the main adsorber, or 225 pounds.

This invention can be embodied in other forms without departing from the spirit or essential attributes thereof and accordingly, references should be made to the following claims, rather than to the foregoing specification, as indicating the scope of the invention.

I claim:

1. A process for removing solvents including halogenated hydrocarbons from an inlet solvent laden air (SLA) stream, comprising the steps of:
    (a) passing the inlet SLA stream through at least two activated carbon absorption beds connected in series;
    (b) regenerating at least one additional activated carbon absorption bed, the regeneration comprising the steps of:
        (i) passing a regenerating vapor through the adsorption bed, the regenerating vapor removing halogenated hydrocarbons and other solvents from the bed;
        (ii) condensing the regenerating vapor to form a liquid fraction having at least one solvent-rich liquid fraction and at least one solvent-poor liquid fraction, said condensation step comprising a bulk vapor condensation step producing a liquid fraction and a vapor fraction, and a vent condensating step downstream to said bulk vapor condensation step, said vent condensation step being adapted to separate non-condensibles from said bulk vapor condensation step;
        (iii) returning non-condensibles to the SLA inlet stream of step (a);
        (iv) separating said liquid fraction from said bulk vapor condensation step and condensed liquid from said vent condensation step into a solvent-rich liquid fraction and a solvent-poor liquid fraction; and
    (c) returning the bed of step (b) to the series of adsorption beds of step (a), and removing at least one of the adsorption beds from the series of step (a) and regenerating this bed by the process of step (b), said returned bed being connected in series downstream to other adsorption beds in said series, said removed bed being removed from a position in said series upstream to other adsorption beds in said series, whereby a cyclic adsorption and regeneration process can be provided which will effectively remove said halogenated hydrocarbons from said SLA.

2. The process of claim 1, wherein said liquid fraction from said bulk vapor condensation step is cooled prior to said liquid separation step to lower the temperature of said bulk vapor condensation liquid fraction to substantially the temperature of said liquid fraction of said vent condensation step.

3. The process of claim 2, wherein said liquid separation step comprises decantation.

4. The process of claim 1, wherein said regenerating vapor is steam.

5. The process of claim 1, further comprising a pre-conditioning step upstream of said adsorption step (a), said pre-conditioning step including the step of passing said SLA through guard-filter means prior to said adsorption step (a), said guard-filter means being adapted to remove contaminants that otherwise might plug said activated carbon bed in said adsorber.

6. The process of claim 5, wherein said guard-filter means comprises an activated carbon bed.

7. The process of claim 6, wherein said pre-conditioning step comprises heat exchange.

8. The process of claim 7, wherein said pre-conditioning step comprises a blower step.

9. The process of claim 1, wherein after said regeneration step (b) and prior to said return step (c), a gas-cooling stream is passed through the adsorption bed to cool the bed.

10. The process of claim 9, wherein the cooling gas is subjected to heat exchange prior to passage through said adsorption bed.

11. The process of claim 10, wherein the cooling gas is air.

* * * * *